UNITED STATES PATENT OFFICE.

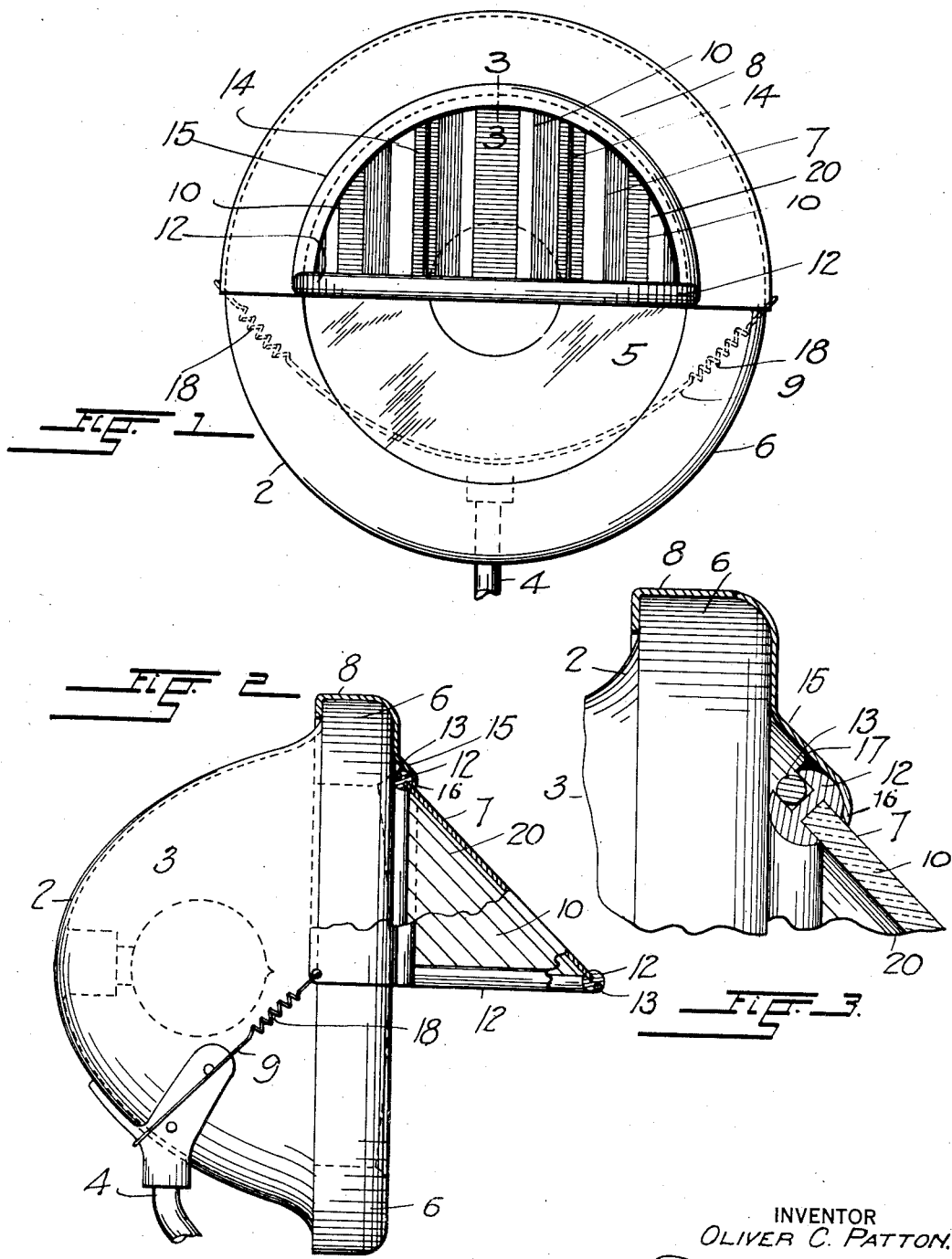

OLIVER C. PATTON, OF DENVER, COLORADO, ASSIGNOR TO THE AUTO DIMMER COMPANY, A CORPORATION OF COLORADO.

DIMMER FOR AUTOMOBILE-HEADLIGHTS.

1,343,886.      Specification of Letters Patent.      Patented June 15, 1920.

Application filed August 14, 1918. Serial No. 249,818.

*To all whom it may concern:*

Be it known that I, OLIVER C. PATTON, a citizen of the United States, residing at Denver, in the county of Denver and State of Colorado, have invented certain new and useful Improvements in Dimmers for Automobile-Headlights, of which the following is a specification.

My invention relates to dimmers for headlights of motor-driven vehicles and its primary object is to provide a shield or shade of simple construction which is readily attached to an automobile headlight, which when in use produces a novel and pleasing effect by the transmission of light in different colors, and which effectively eliminates the blinding glare of the lamp in the headlight to which it is applied by intercepting the upwardly deflected light-rays.

Other objects of my invention reside in providing a novel method of assembling the constitutent parts of the dimmer and in providing a simple and effective means for securing it upon a headlight of conventional construction, and these and other objects all of which will fully appear in the course of the following description, I attain by the construction and combination of parts illustrated in the accompanying drawing in which like characters of reference designate corresponding parts throughout the various views and in which—

Figure 1 represents a front view of a headlight to which a dimmer of my improved construction is attached, Fig. 2, a sectional side elevation thereof, and Fig. 3, an enlarged fragmentary section along the line 3—3, Fig. 1.

Referring more specifically to the drawings, the reference numeral 2 designates a headlight of the type commonly used on motor vehicles, including a reflector 3 supported upon a standard 4, a lens 5 which covers the front of the reflector, and a retainer ring 6 which by connection with the reflector secures the lens in place thereon.

My improved dimmer consists of a shade or shield 7 which is curved to cover and project forwardly of the upper portion of the lens of a headlight, and suitable means such as the hanger 8 and the resilient band 9 of the construction shown in the drawings, for holding it in place.

The shade consists of a translucent covering 20 made of glass or other suitable material and set in a frame 12 which is formed to correspond with the curvature of the upper portion of the lens of the headlight and to project slantingly in front thereof.

The frame of the shield is preferably composed of a strip of pliable metal edging which is bent and curved to conform with the contour of the translucent covering of the shield and which is longitudinally grooved at opposite sides.

The translucent covering of the shade is set in the inner groove of the frame and a correspondingly bent piece of spring wire 13 occupies the outer groove of the same to secure the parts of the shade against relative displacement.

A pair of wire braces 14 extend transversely between the upper and lower curved portions of the frame to reinforce the structure.

The hanger 8 for attaching the frame to the headlight consists of a curved strip of metal which is of channel section to fit upon the upper portion of the lens-holding ring of the headlight.

The hanger has at its front side a forwardly slanting flange 15 the edge of which is curved inwardly as at 16 to embrace the upper portion of the frame 12 of the shield, which is secured thereto by a fillet of solder 17 as best shown in Fig. 3 of the drawings.

The strap 9 which holds the hanger in place on the headlight, consists in its preferred form, of a piece of spring wire which is coiled as at 18 to produce the desired longitudinal resilience and which at its extremity is attached to the ends of the hanger.

When the shield is in place upon the headlight, the resilient strap embraces the reflector thereof as shown in the drawings and thereby secures the support against displacement.

The translucent covering 20 of the shield is preferably composed of a number of narrow panes of glass 10 of different colors which are arranged to produce a pleasing and artistic effect when the light-rays emitted from the headlight pass through them. Red, white and blue strips of glass arranged in the order of the colors of the national emblem are particularly appropriate.

It will be seen that a shade of the construction shown and described, slanting in front of the upper portion of the lens of a headlight, will intercept the light rays deflected from the lower portion of the reflector and thereby eliminate the blinding glare which is an annoyance as well as a source of danger to pedestrians or occupants of approaching vehicles.

The variegated translucent covering of the shield produces at the same time a pleasing and attractive effect and the interchangeability of the panes of glass of which it is composed permits of varying their arrangement so that if so desired, different makes of automobiles or different owners of motor driven vehicles may use shields of distinctive appearance.

Having thus described my improved dimmer in the best form at present known to me, I desire it understood that variations in the form and arrangement of its constituent parts may be resorted to within the spirit of my invention as defined in the following claims:

1. A dimmer for automobile headlights comprising a shade formed to slantingly cover the upper portion of the lens of an automobile headlight, and composed of a frame having opposite longitudinal grooves, a pane of translucent material set in the inner groove of the frame, a resilient holding-member in the outer groove of the same, and means for holding the frame in its operative position on a headlight.

2. A dimmer for automobile headlights comprising a shade of substantially semiconic form composed of adjoining sections of glass of varying degrees of translucence and means for its connection adjoining the upper portion of the lens-holding rim of an automobile headlight, whereby to extend slantingly in front of the upper portion of the lens of the same.

3. A dimmer for automobiles comprising a shade of a substantially semi-conic form composed of a rim and edge-to-edge adjoining strips of translucent material set therein, and means for its connection adjoining the upper portion of the lens-holding rim of an automobile head-light, whereby to extend slantingly in front of the upper portion of the lens of the same.

In testimony whereof I have affixed my signature.

OLIVER C. PATTON.